Patented Oct. 10, 1922.

1,431,519

UNITED STATES PATENT OFFICE.

EUSTACHE EDMOND RENÉ GAUDART, OF PARIS, FRANCE.

PROCESS FOR THE EXTRACTION OF COCONUT BUTTER.

No Drawing.      Application filed September 10, 1918. Serial No. 253,463.

*To all whom it may concern:*

Be it known that I, EUSTACHE EDMOND RENÉ GAUDART, citizen of the Republic of France, residing at 12 Avenue Trudaine, Paris, in the Republic of France, have invented new and useful Improvements in Processes for the Extraction of Coconut Butter, of which the following is a specification.

The mechanical processes that are employed at present for extracting the fatty substance from the nut of the cocotree (*Cocos nucifera*) are all based on the following operations.

The kernel gathered when ripe is separated from the shell in which it is enclosed, then split in the middle and dried in the sun or in a stove. The kernel, when it has been sufficiently dried, is known by the name of "copra," and is sent to the oil works. The operation for the extraction of the oil in the works consists in converting the "copra" into very small fragments and then into a very fine paste. The paste thus obtained is heated to coagulate the albumen and the mucilaginous substances and then subjected three times in succession to the action of powerful hydraulic presses. The oil issuing from these presses is then filtered and then converted in edible "coconut butter" by a series of further tedious operations.

Coconut butter as it occurs in commerce is simply an oil that has been completely purified in such a manner as to free it from the rancidity which it always possesses in various degrees and to eliminate from it the repulsive smell and flavour which it would otherwise impart to food. The crude oil receives an addition of powdered lime and is then heated in a vacuum. The fatty matters are saponified forming an oleate of lime which is precipitated. The oil is separated in a filter press which retains the saponified portion. Deoderization is then effected by injecting steam through a mass of oil in a finely divided state. The resulting product is ready to be placed upon the market under the name of "edible coconut butter."

The series of operations for producing an edible product is long and expensive. The manufacture of the copra first of all requires enormous care. In certain countries drying in the sun is impossible during the whole of the rainy season and recourse has to be had to drying by means of smoke or a stove.

These various means employed for drying the kernal have the serious drawback of producing a copra of more or less dark colour, giving out a repulsive odour and yielding when ground a rancid oil of reddish colors.

Even when the drying has been performed with the greatest care, it gives rise to the production of free fatty acids, at the expense of the water and albuminous substances contained in the kernel. This percentage of fatty acids is sometimes so high in some kinds of copra that it is impossible to use them for the manufacture of coconut butter.

After the drying and up to the moment of grinding there also take place in copra acid fermentations that are due to micro-organisms and favoured by the high temperature of the country of origin and in the hulls of the vessels during their transport. These fermentations intensify the acidity of the kernel which shows itself by a very disagreeable smell and by chemical decomposition of the fatty substance. This decomposition has the effect of causing a partial destruction of the glycerine in the combined state, which when once decomposed cannot afterwards be recovered.

The extraction of the oil by means of hydraulic presses is also attended by numerous drawbacks. However powerful may be the pressure of those apparatus, it is unable to extract completely the oil from the materials treated which always retain a certain amount by surface attraction with a tenacity such that no pressure would be able to eliminate it. Before subjecting the copra paste to the action of the presses it is heated in order to facilitate the extraction of the oil and increase the yield.

The heat coagulates the albumen and the mucilaginous substances and the oil runs out in a more limpid condition but, as against this, the heated oil readily absorbs the odoriferous and bad-smelling matters and it acquires a dark tint.

It will thus be perceived that the hitherto-used processes for the extraction of coconut butter which comprise the conversion of the coconut kernel into copra and the extraction by means of hydraulic presses, have the drawback of deteriorating the fatty substance which is contained in the cells of the fresh endosperm in a state of perfect purity, said fatty substance being then odorless and having the flavour of freshly churned cow's butter. The purifying process by removing the smell and the rancidity from the coconut fat, allows of using it as an edible fat, but in the course of those numerous manipulations it has lost all it natural qualities that render it an edible product of the highest order.

The present invention has for its object to provide an improved process for the manufacture of coconut butter, which whilst being more simple of execution than the processes hitherto employed, is not attended by the drawbacks above referred to in connection with those processes.

The improved processes comprise:

1. The extraction of the vegetable milk of the coconut by means of mechanical apparatus without the use of chemical agents, from fresh ripe kernels such as they are found inside the nuts at the moment when they are to be opened for the manufacture of copra.

2. The purification of this milk and its treatment for the purpose of manufacturing an "edible coconut butter," whose composition and flavour shall be very close to those of cow's butter, which qualities are not possessed by the hitherto known products of this kind.

3. The recovery of the by-products from these operations under new forms, namely, pure cellulose and albumen (vegetable casein) in place of the copra cakes obtained by the hitherto known processes.

When the coconut is ripe the endosperm contains the whole of the fatty substances in the form of a milky emulsion closely resembling cow's milk. The liquid is alkaline, white and opaque, composed of fatty particles held in emulsion; its flavour is mellow and slightly sweet, and it appears to be formed of a multitude of globules that reflect the light brightly without absorbing it and thus produce the milky white colour. The fatty substances are emulsified in the liquid owing to the albuminous and caseinous matters enclosed in vesicles that are composed exclusively of pure cellulose forming the cellular tissue of the kernel. The cells of this tissue are connected together by a resinous gum. When the milk is extracted mechanically, its composition and its flavour would not differ very much from those of cow's milk if this resinous gum were not present in the milky globules.

For this reason the inventor has proposed, with the object of obtaining the vegetable butter of the coconut in all its purity, to free this mechanically extracted milk from its contained cellulose; then to purify it from the resinous gum which it holds in suspension; and finally to treat it like cow's milk in order to separate the butter therefrom.

The industrial application of this process may comprise the following operations:

1. The extraction of the kernels from their shells.
2. The conversion of the kernels into small fragments and into a very fine paste.
3. The separation of the cellulose from the milk of the coconut.
4. The purification of this milk.
5. The separation of the butter from the purified milk by the following operations, namely:—
   (a) Separating the cream from the milk.
   (b) Pasteurizing and fermenting the cream.
   (c) Churning and crystallizing (granulating).
   (d) Kneading the butter.

By way of example the following is a detailed description of the various operations of the improved process.

1. *The extraction of the kernels from their shells.*—The nut is opened in order to separate the kernel from its woody envelope, for which purpose use is made of a rotary circular saw that cuts the nut into two parts; the kernel is then removed by means of a knife.

2. *The conversion of the kernel into paste.*—This operation is effected by means of a disintegrator that reduces the kernels to small fragments or pulp. The kernels thus ground are then diluted with water or preferably with skimmed "coconut milk" derived from the later operations; this milk is poured upon the paste. At first only very little of this milk is added in order to form only a soft and very moist paste. Then the whole is crushed in runner mills of the type usually employed in oil works, until a homogenous magma is produced. The milk at a temperature of 30° C. is added gradually as the grinding operation progresses.

3. *The separation of the cellulose from the coconut milk.*—When by reason of the addition of the milk the mixture has become sufficiently liquid, the grinding is stopped and this mixture is poured into mixers consisting of rectangular vats provided with mechanical agitators, and there is gradually added a suitable quantity of skim milk so as to produce a milky and rather fluid liquid. When the mixing is finished the resulting liquid is forced by a pump into a filter press fitted with cloths having suitable meshes that allow the emulsion to pass through but retain the skins; the liquid that filters through is collected. The residual pulp issuing from this first filtering and pressing is ground, and, in a word, is subjected a second time to the hereinbefore described treatment just as if it were a question of a fresh kernel paste. The filtered liquid is united to that derived from the first operation. The cellulose retained between the plates of the filter press is then removed for the purpose of being dried.

*4. Purification of the milk.*—The milk issuing from the filter press is poured automatically at a regulated speed of delivery into a turbine having a rapid and regular rotary motion. By the action of centrifugal force, the resinous bodies in suspension in this liquid are pressed and held against the sides of the drum whilst the purified milk flows out through an aperture provided in the upper part of the drum.

*5. Separation of the vegetable butter from the purified milk.*—The milk is delivered into a centrifugal cream-separating machine that separates out the fatty substances in the form of cream. The liquid derived from the separating process is stored in vats after a portion has been drawn off for the separation of the cellulose from the milk, this portion being employed in the operations mentioned under (2) and (3). The stored liquid is treated with a view to the recovery of the vegetable casein. The cream recovered in the cream-separating operation is pasteurized in cylindrical vats in which there is then produced a lactic fermentation by means of a suitable ferment, care being taken to maintain the temperature between 25 to 30° C. At the end of twelve hours, the fermentation having disintegrated the casein substances, the cream is delivered into churns wherein it is agitated for fifteen minutes at a temperature of 15°. The fatty substance separates from the milk by crystallizing into clots which are removed by simple decantation.

On leaving the churns the butter still contains water and albumen that is soluble in water intermingled with the fatty substance. For the purpose of freeing it from these bodies the butter is kneaded in a kneading machine by means of a fluted conical roller. A water cock with sprinkling pipe is provided above the roller for washing the fatty substances.

The extraction of the albumen or vegetable casein from the liquid obtained in the cream-separating operation referred to under (5) is effected in cylindrical wooden vats provided with mechanical agitators and heating-worms. 500 grammes of pulverized gypsum are added for every 1000 litres of liquid and the whole is heated. The casein precipitates in large clots which are recovered after filtration and washed on metallic cloths. These clots are then pressed and afterwards dried.

The improved process of extracting the coconut butter according to this invention may also be performed in the following manner:—

After having extracted the kernels from their shells they are gradually crushed and the product is placed in screw presses similar to those employed in the wine making and sugar industries for pressing grapes or beetroots. 60% of the total amount of milk contained in the kernels can thus be extracted. This milk is then subjected to the operations above referred to under (4) and (5); 40% of the milk remains in the kernel residues. These residues are crushed to a fine paste which is subjected to the operations mentioned in (3), (4) and (5).

Whatever is the procedure that is employed, the details of the operation may be modified without departing from the nature of the invention.

Having now described my invention, what I claim as new and desire to secure by Letters Patent is:

1. A process for treating the kernels of coconuts which consists in extracting the kernels from their shells, crushing and moistening the fresh kernels to form a paste, diluting said paste, with skimmed coconut milk previously obtained, at a temperature of approximately 30° C., treating the liquid formed in filter presses so as to extract the milk contained therein, and treating the milk in centrifugal apparatus for removing the resinous matters.

2. A process for treating the kernels of coconuts which consists in extracting the kernels from their shells, crushing the fresh kernels, adding to the crushed kernels skimmed coconut milk left from previous operations, the milk being at a temperature of approximately 30° C., stirring the pulp, triturating the paste with coconut milk through runners, forcing the pulp obtained to pass through a filter press in order to free the milk from cellulose, and subjecting the issuing vegetable milk to the action of centrifugal force to free the same from the resinous gum suspended in the liquid.

In testimony whereof I have signed my name to this specification in the presence of two subscribing witnesses.

EUSTACHE EDMOND RENÉ GAUDART.

Witnesses:
ANTOINE LAVOIX,
JOHN F. SIMONS.